May 21, 1929.  F. H. PERRY  1,713,550
METHOD OF MANUFACTURING SHOE SOLES
Original Filed July 13, 1920  3 Sheets-Sheet 1

INVENTOR
FREDERICK H. PERRY, DEC'D
EDNA A. PERRY, EXECUTRIX
BY HER ATTORNEY

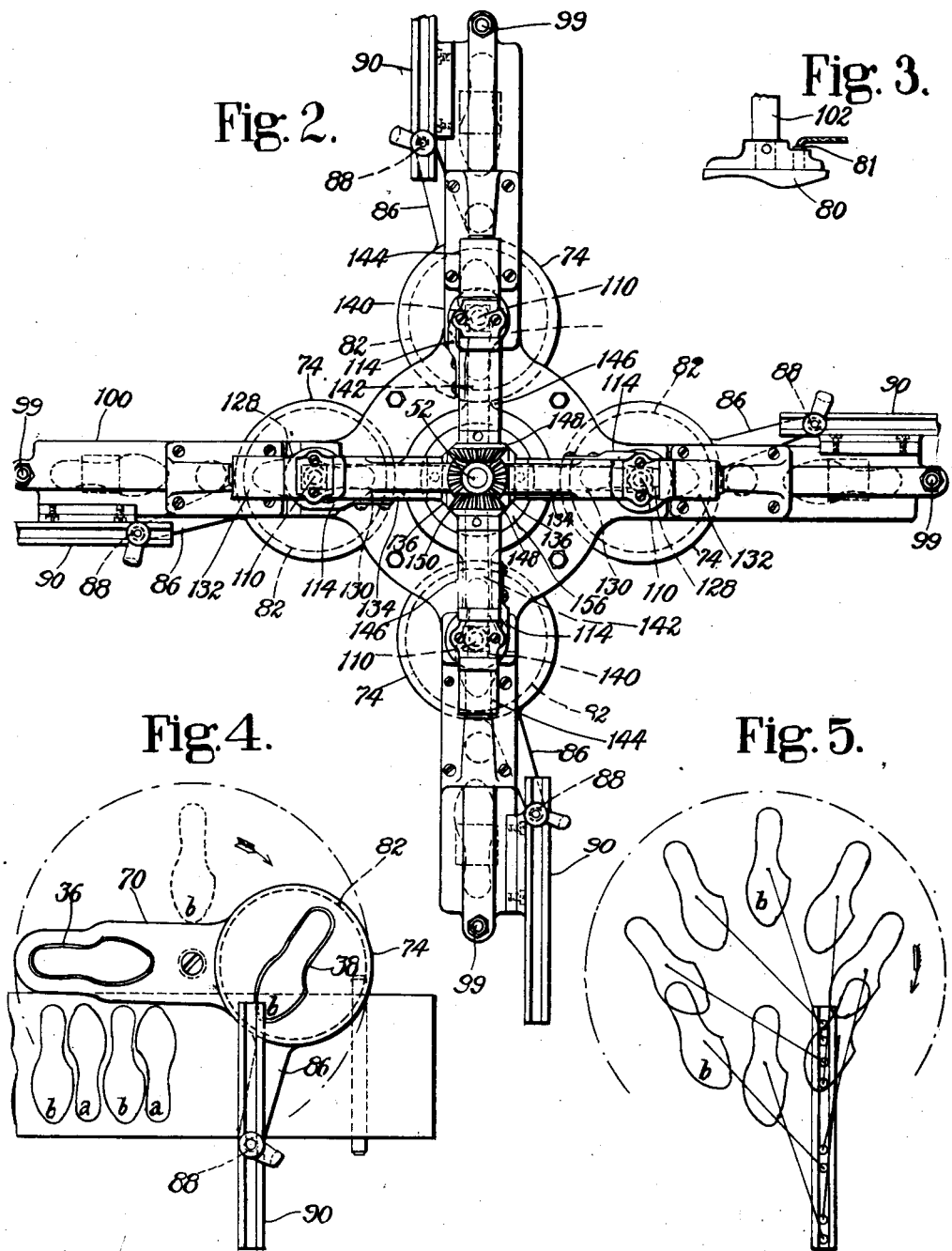

May 21, 1929.  F. H. PERRY  1,713,550
METHOD OF MANUFACTURING SHOE SOLES
Original Filed July 13, 1920  3 Sheets-Sheet 3
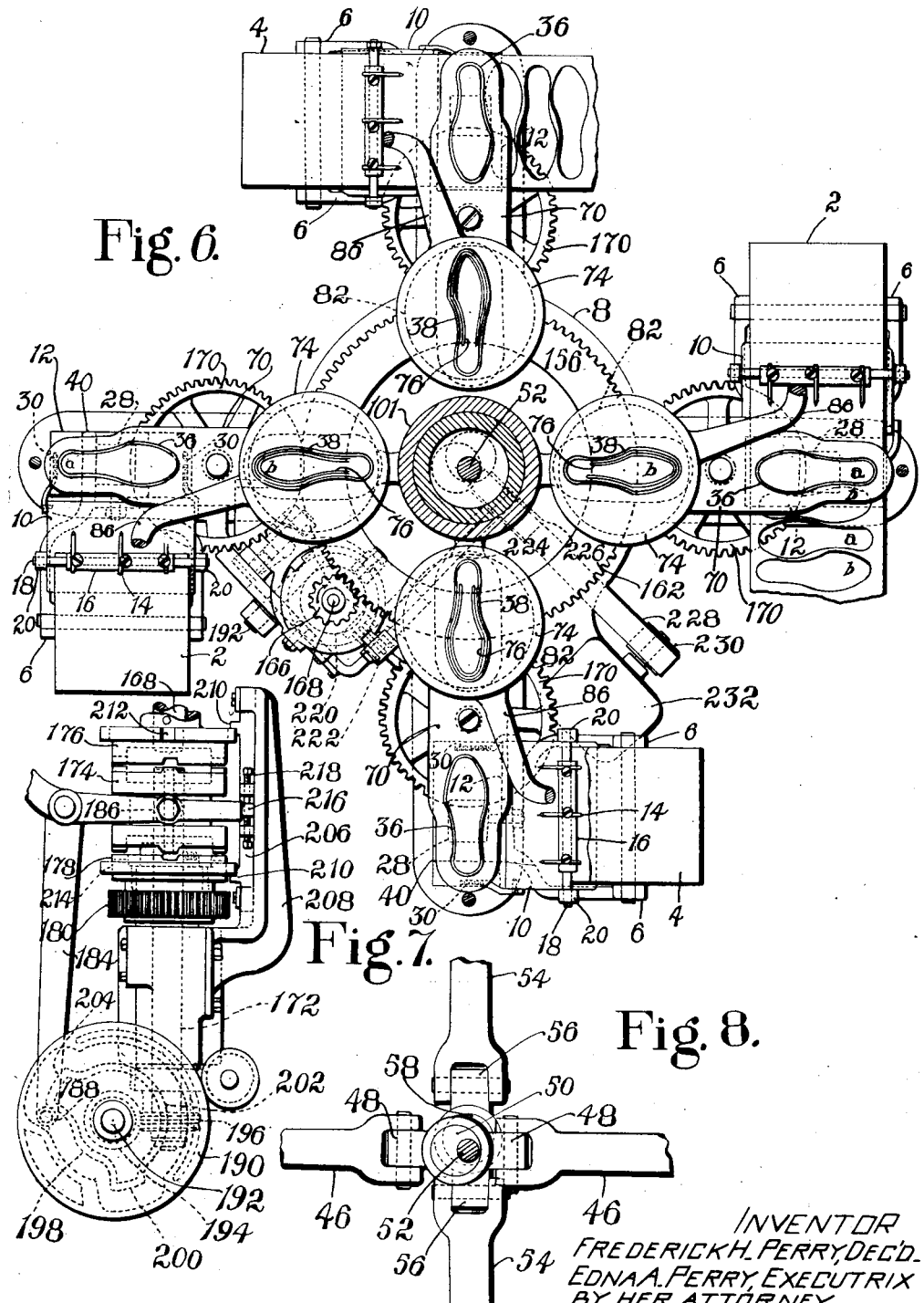

Patented May 21, 1929.

1,713,550

UNITED STATES PATENT OFFICE.

FREDERICK H. PERRY, DECEASED, LATE OF BEVERLY, MASSACHUSETTS, BY EDNA A. PERRY EXECUTRIX, OF BEVERLY, MASSACHUSETTS, ASSIGNOR TO UNITED SHOE MACHINERY CORPORATION, OF PATERSON, NEW JERSEY, A CORPORATION OF NEW JERSEY.

METHOD OF MANUFACTURING SHOE SOLES.

Original application filed July 13, 1920, Serial No. 395,820. Divided and this application filed January 25, 1928. Serial No. 249,476.

This invention relates to the manufacture of shoe-soles and more particularly to a novel method of making what are known commercially as manufactured insoles.

Manufactured insoles for welt soles commonly comprise two or more layers of suitably shaped sheet-material secured together in face-to-face relation, at least one of the layers having a projection or sewing-rib formed thereon to which the upper-materials and welt of the shoe are sewed.

An object of the invention is to provide an improved method adapted to be employed in the manufacture of articles of the type above indicated or of others suitable for such purposes.

With this object in view, the present invention contemplates, in making an article of this type, simultaneously molding sewing-ribs in successive sole-blanks and pressing second sole-blanks upon previously ribbed blanks, which blanks may have been cut successively from two strips of sheet-material simultaneously and at different locations, the ribbing and pressing operations also taking place simultaneously at different locations, and shifting each ribbed blank from one to the other location in periods between the ribbing and pressing operations and during the time consumed in the cutting operations.

The method of the present invention will be clearly understood from the following description and accompanying drawings illustrating a machine adapted to carry out the method, in which Fig. 1 is a front view of said machine;

Fig. 2 is a plan view of the upper portion of the machine;

Fig. 3 is a detail side elevation of the press-die;

Fig. 4 is a detail plan view of a portion of the blank-cutting and transferring mechanism;

Fig. 5 is a diagrammatical view illustrating the operation of the mechanism of Fig. 4;

Fig. 6 is a sectional plan view taken on the line VI—VI of Fig. 1;

Fig. 7 is a side elevation of the clutch and its actuating mechanism; and

Fig. 8 is a sectional plan view of a portion of the mechanism for actuating the blank-cutting mechanism.

Figure 1:
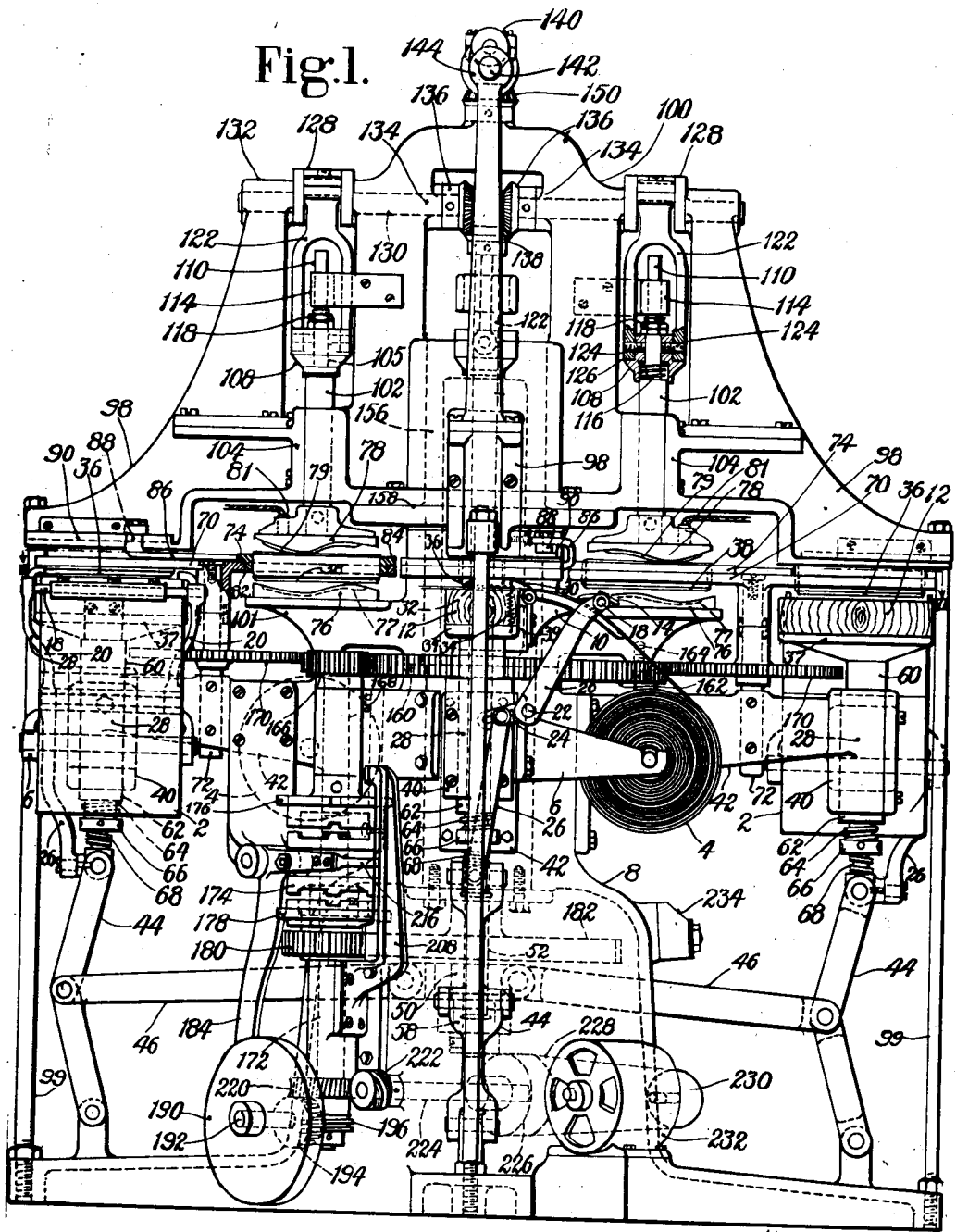

While the machine and method hereinafter described may be employed in making manufactured soles of two or more layers of material, it has been found in commercial practice that satisfactory results have been obtained from a three-layer sole. Accordingly, the method of manufacturing a three-layer sole has been shown in the drawings for the purpose of explaining the invention, but with no intent of limiting the invention to the particular type of sole except where so distinctly stated in the appended claims.

By the method performed with the aid of the illustrated machine, a three-layer insole composed of an intermediate layer of fabric or a leather-substitute such as fiber, and outer layers forming the sewing and sock-surfaces, of canvas and leather-skiving, respectively, is being manufactured. The stock from which the component layers of the insole are formed may be supplied from strips of the material which are wound in rolls, the intermediate and leather skiving strips being previously cemented together in face-to-face relation to form a single compound strip. The roll of canvas and the roll forming the compound strip are independently supported on the machine and are intermittently fed simultaneously over separate cutting blocks. Between the intermittent feeding movements of the strips, cutting dies co-operate with the cutting blocks to cut progressively from the strips, blanks of substantially the shape of the insole to be formed. The blanks, as they are cut from the canvas strip, are severally transferred to a position between male and female sewing-rib forming dies, and the blanks as they are cut from the compound strip are severally transferred to a position beneath the sole-pressing die. After the sewing-rib forming dies have operated on a canvas blank, the female die with the ribbed blank supported thereby is transferred to a position beneath the sole-pressing die when it receives on its unribbed face a blank which has been cut from the compound strip. These dies then co-operate to press the two blanks together, and, if desired, to mold them to the contour of the last-bottom, thereby completing the formation of an insole. In order to secure the two pieces of material together, the fiber or fabric side of the compound strip, before being wound and supplied to the machine, is coated with a prepared cement, normally non-adhesive, that becomes tacky upon the application of a certain degree of heat. The sole-pressing die is maintained at the proper temperature to supply such degree of heat to the adhesive coating, and thus cause an adhesion of the two blanks during the pressure-applying operation. It has been determined that heat applied to the canvas blank during the sewing-rib forming operation will assist materially in the proper formation of the sewing-rib. Accordingly, means is provided for heating the male sewing-rib forming die as well as the pressing die.

The illustrated machine is of the turret type and is adapted to make two insoles simultaneously. Accordingly, material is supplied to the machine from two rolls of canvas strips 2 and two rolls of the compound fabric and leather strips 4 (Figs. 1 and 6). The several rolls of strips are mounted on brackets 6, 90° apart secured to the base 8 of the machine, the brackets supporting the rolls of canvas strips being located at opposite sides of the base, and the brackets supporting the rolls of fabric and leather strips being located at the front and rear of the base. The ends of the strips are drawn from the rolls over tables 10 (Fig. 1) and cutting blocks 12, the tables being located between the rolls and cutting blocks and adjacent the latter. Each of the strips is fed over its supporting table and cutting block by means of a series of feed-fingers 14 which comprise pins secured to a sleeve 16 fixed on a horizontal pin 18 having its ends pivotally mounted in the upper ends of a pair of arms 20 (Fig. 6) located at opposite edges of the strip. The lower ends of the arms 20 are secured to the opposite ends of a rock-shaft 22 journaled in the bracket 6. An arm 24 is secured to the outer end of the rock-shaft 22 and is connected by a link 26 to the lower end of a vertically movable plunger 28 (Fig. 1) mounted in another bracket on the base of the machine, the functions of which plunger will presently be described.

The supporting surface of the table 10 is curved lengthwise concentrically with the axis of the rock-shaft 22, and the points of the feed-fingers 14 are held by gravity in engagement with the portion of the strip supported by the table. With this construction, it will be apparent that during a downward movement of the plunger 28 the feed-fingers will grip and feed the strip from the roll over the supporting table 10 and cutting block 12, and during an upward movement of the plunger 28 the fingers will slide back over the strip. To enable the length of the feeding movement to be varied, the pivotal connection between the link 26 and the arm 24 is adjustable longitudinally of the arm see (Fig. 1). Each strip is held in position during the retraction of the feed-fingers 14 by means of a pair of stock-grippers 30 comprising forwardly reaching arms pivotally mounted on opposite sides of the table 10 and provided with ratchet-teeth 32 which are held in engagement with the strip by means of coiled springs 34 having their opposite ends attached respectively to the arms and cutting-block-support. The ratchet-teeth are so shaped as to effectively hold the strip from movement during the retraction of the feed-fingers 14 and to permit the strip to freely move beneath the grippers as it is fed forward. The intermittent feeding movements of the four strips occur simultaneously, and between such movements of each strip, its cutting block is forced upwardly to co-operate with one or the other of two cutting dies 36 and 38 to cut from the strip a blank of substantially the shape of the insole to be formed, whereupon the cutting block is retracted and then the next feeding movement of the strip occurs. To enable the several cutting blocks 12 to be thus actuated, they are mounted upon supports 37 at the upper ends of the plungers 28. The tables 10 move vertically with the blocks and are secured to vertical plates 39 projecting from the supports 37 beside the blocks (Fig. 1). The four plungers 28 are mounted to slide in vertical bearings 40 formed in the ends of four bracket-arms 42 secured to the base 8. The lower ends of the plungers 28 are pivotally connected to the upper arms of four toggles 44 (Fig. 1), the lower arms of which are pivotally mounted on the base 8. The knees of the two opposite toggles associated with the mechanism for operating upon the canvas strips are connected by links 46 (Figs. 1 and 8) with lugs 48 on opposite sides of an eccentric strap that engages an eccentric 50 carried by a vertical driving shaft 52 extending through the center of the frame of the machine. The other two toggles are similarly connected by links 54 with lugs 56 on opposite sides of an eccentric strap that engages an eccentric 58 carried by the main shaft 52 below the eccentric 50. With this construction, it will be apparent from an inspection of the drawings that during one rotation of the driving shaft 52, the four toggles will be straightened to simultaneously raise the plungers 28, and broken to simultaneously lower the plungers.

In order to adjust the cutting blocks to compensate for wear, the plungers 28 have provision for vertical adjustment relative to their actuating toggles. Each of the plungers 28 is provided with a shank 60 that extends through the bearing 40 and is squared to prevent the shank from turning in the bearing. The lower end of the shank 60 (Fig. 1) is provided with a socket 62 into which is screw-threaded a sleeve 64 having a flange 66, in which are spanner-openings, formed on its lower end. A rod 68 is screw-threaded into the sleeve, the lower end of which rod constituting the lower end of the plunger. The rod 68 and the exterior of the sleeve 64 are oppositely threaded. It will be apparent from this construction that by rotation of the sleeve 64 through the flange 66 the cutting block may be easily and quickly adjusted to the extent desired.

The cutting dies 36 and 38 of each of the four sets are mounted on opposite ends of a turn-table 70 (Figs. 1 and 6) that is journaled on the upper portion of a stud-shaft 72 having its lower end secured in an aperture in the bracket-arm 42. The dies are made of bar-stock, the die 36 being secured in an aperture of like configuration at one end of the turn-table 70, and the die 38 being secured in a similar aperture in a disk 74 mounted on the opposite end of the turn-table. The machine is illustrated in the drawings as stopped in such position that the dies 36 are directly above the cutting blocks, and the dies 38 are directly above a series of four revoluble female sewing-rib forming dies 76. After the cutting blocks have been reciprocated to cooperate with the cutting dies 36 to cut blanks from the four strips, the turn-tables 70 are turned to reverse the position of the cutting dies 36 and 38, the blanks just severed remaining in the cutting dies 36 by frictional contact therewith.

Adjacent to the two stations where blanks are died out of the canvas strip and above the two female sewing-rib forming dies that may, at any cycle, be opposite these stations, are two male sewing-rib forming dies 78, which are mounted for vertical reciprocation in the frame and do not follow the angular travel of the female dies with which they co-operate. Two sole-pressing dies 80 are similarly mounted at the other two quadrants of the turret adjacent the two stations where blanks are died out of the fabric and leather strip. A detailed description of these dies 78 and 80 will be deferred until later.

Upon the coming into position, over the female dies 76, of the blank-cutting dies 36, the four dies 78 and 80 move downward through the cutting dies 36 thus removing the blanks from the cutting dies and positioning them upon the female dies 76. During the actuation of the upper dies 78 and 80, the cutting blocks are raised to cut the next pieces from the strips.

In order to prevent waste of material, the blanks are cut reversely in respect to their ends from each strip by the dies 36 and 38 in the manner shown in Figs. 4 and 6. Each cutting die 36 is positioned on the turn-table with its heel-end pointing outward and consequently the blanks cut by them have their heel-ends adjacent the outer edges of the strips, as indicated at $a$, Fig. 4. Since the cutting dies 38 must cut blanks with their toe-ends adjacent the outer edges of the strips, as indicated at $b$, Fig. 4, the dies 36 and 38 must be brought over the strips in reversed positions, although they both are brought to a corresponding position over the female dies 76, the toe-ends of which always point outwardly. To this end, each disk 74 carrying a cutting die 38, is rotatably mounted in a circular aperture 82 in the turn-table. The disk has a portion of smaller diameter which fits within the aperture and a portion of larger diameter which forms a flange 84 (Fig. 1) that bears on the surface of the turn-table surrounding the aperture. An arm 86 (Figs. 2 and 4) projects from the disk, the free end of said arm being provided with a roll 88 that engages a straight groove in a bar 90 secured to the upper section 100 of the frame of the machine. With this construction, it will be apparent from an inspection of Figs. 4 and 5 that during the rotation of the turn-table 70 the disk 74 will swing back and forth within the aperture 82 in such manner as to always maintain the toe-end of the cutting die 38 pointing outward for its co-operation with both the strips on the cutting blocks and the female dies 76.

As hereinbefore stated, the dies 78 and 80 are located directly above the series of four female dies 76, the dies 76 being equally spaced about a turret 101, hereinafter described. In order that the dies 78 may co-operate with the pair of adjacent dies 76 to form sewing-ribs in the blanks cut from the canvas strips, these dies 78 are provided with ribs 79 (Fig. 1) which are adapted to crimp the canvas and force it to enter grooves 77 formed in the dies 76. The dies 80 are adapted to co-operate with the pair of adjacent dies 76 to press the blanks cut from the fabric and leather strips against the ribbed layer of canvas previously formed on the dies 76. As illustrated, all the dies are formed to mold the work and consequently the layers, as they are cut, are shaped to the surface-contour of the dies. To assist in the molding action of the dies 78 and 80, these dies are heated to a proper temperature by means of electric heating units 81 inserted in sockets therein. The heating of the dies 80 also causes the adhesive coating on the fabric side of the fabric and leather blanks to be properly conditioned so that they will be securely attached to the canvas blanks upon operation of the dies 80. Upon retraction of the dies 78 and 80, the turret 101 is turned one-quarter of a revolution to transfer the two dies 76 which have co-operated with the dies 78 in forming sewing-ribs in the canvas blanks, to a position beneath the dies 80. Likewise the two dies 76 which have co-operated with the dies 80 are positioned beneath the sewing-rib forming dies 78. During the movement of the turret 101, each turn-table 70 is rotated one-half a revolution to present the next blank cut from the strips beneath the dies 78 and 80, respectively. At the completion of his movement of the turret, the dies 78 and 80 are again forced down upon the dies 76, the dies 80 removing the fabric and leather pieces from their cutting dies and pressing them down upon the unribbed faces of the canvas pieces to complete the formation of the insoles, and the dies 78 co-operating with the two adjacent dies 76 to form sewing-ribs in the canvas pieces which have been placed between them. This cycle of operation is repeated, it requiring two reciprocations of the upper dies to complete each sole. During each turning movement of the turret, the completed insoles may be removed from the dies 76 either by hand or automatically, as by pneumatic means.

To compensate for the material taken up in forming the sewing-ribs in the canvas blanks, the cutting dies at the canvas cutting stations are shaped to produce a blank slightly larger about the forepart and shank than is required for the fabric and leather blanks. In consequence, the canvas blanks and fabric and leather blanks are of the same size and shape when assembled, and no subsequent trimming operation is required.

The vertical location of the turn-table carrying the cutting dies is such that it swings the dies alternately just beneath radially projecting brackets 98 of the upper frame-section 100, which brackets are held rigid by long bolts 99 (Fig. 1) rising from the base of the frame. The brackets 98 take the thrust of the cutting blocks 12 when they are moved upward by the toggle-actuating mechanism.

Each of the dies 78 and 80 is secured to the lower end of a plunger 102 (Fig. 1) which is mounted to slide in a bearing 104 in the upper section 100 of the frame. The portion of the plunger 102 that extends through the bearing is square in cross-section to prevent the plunger from turning, and the portion 105 of the plunger adjacent the upper end of the squared portion is cylindrical and passes through a cylindrical socket in the under side of a block 108 and through a central bore in said block. The plunger is provided with a tail-rod 110 extending from the upper end of the cylindrical portion 105, which passes through and is guided by a bearing 114 on a bracket projecting from the upper section of the frame. An expansion-spring 116 is coiled about the reduced portion 105 of the plunger and is housed within the socket of the block 108, its lower end bearing on the upper end of the squared portion 102 of the plunger. The downward movement of the plunger under the influence of the spring 116 is limited by nuts 118 threaded on the shank 105 and engaging the top of the block 108. By adjusting the nuts 118 on the shank 105, the pressure exerted by the dies on the work may be varied as desired. The die-carrying plungers 102 are reciprocated by crank-actuated links 122 having their lower of screws 124 threaded into the block 108. The lower portion of each link 122 is bifurcated to embrace the block 108 and the ends of the arms of the link are provided with appertures which engage pivot-pins in the form of screws 124 threaded into the blocks 108. In order to prevent undue pressure on the pivot-pins 124 during the work-engaging movement of the dies, the extreme ends of the arms of the bifurcated link 122 engage shoulders 126 formed on the block 108.

The links 122 associated with the sewing-rib-forming dies 78 are pivotally connected at their upper ends with cranks 128 formed on oppositely disposed shafts 130 having their outer ends journaled in bearings 132 formed on brackets secured to the radial brackets 98 of the upper frame-section and their inner ends extended through bearings 134 in said upper section. The shafts 130 are driven by beveled gears 136 secured on their inner ends, which gears engage a beveled gear 138 carried by the central driving shaft 52.

The links 122 associated with the sole-pressing dies 80 are pivotally connected at their upper ends with cranks 140 (Fig. 1) formed on oppositely disposed crank-shafts 142 (Figs. 1 and 2) having their outer ends journaled in bearings 144 formed on brackets secured to the upper section 100 of the frame and their inner ends extended through bearings 146 in said upper section. The crank-shafts 142 are driven by beveled gears 148 secured on their inner ends, which engage a beveled gear 150 secured to the upper end of the driving shaft 52.

The female dies 76 are mounted on arms of the turret 101, which is journaled on a bearing-sleeve 156 (Fig. 1) projecting downwardly from the upper section 100 of the machine-frame and held from longitudinal movement by being interposed between a shoulder 158 formed on the upper section of the frame and a shoulder 160 formed on the base 8 of the frame. The turret 154 is intermittently rotated in proper timed relation to the actuation of the upper dies 78 and 80 by means of an annular gear 162 (Figs. 1 and 6) secured by screws 164 to the under sides of the arms of the turret, which gear is engaged by a driving pinion 166 secured on the upper end of a vertical shaft 168 which is journaled in a bearing formed on a bracket projecting from the base 8.

The turn-tables 70 also are actuated by the annular gear 162, which gear meshes with gears 170 (Figs. 1 and 6) on the lower ends of the elongated hubs of the turn-tables.

The shaft 168 which actuates the turret 154 and the turn-tables 70, and the shaft 52 which actuates the upper dies 78 and 80 and the feeding and cutting mechanisms are both driven from a continuously rotating driving shaft 172 journaled in a bearing in the base 8 and arranged in alinement with the shaft 168. The shaft 172 drives the shafts 168 and 52 through a clutch (Figs. 1 and 7) comprising a double driving clutch member 174 splined to slide axially on the shaft 172, a driven member 176 at the upper side thereof secured to the lower end of the shaft 168 and a driven member 178 at the lower side thereof loosely mounted on the shaft 172. The driven member 178 has a pinion 180 formed thereon that engages a gear 182 secured to the shaft 52. The driving clutch member 174 is adapted to be shifted into engagement with either of the driven members by means of a bell-crank lever 184 pivotally mounted on a plate depending from one bracket 42, one arm of which lever carries a roll 186 engaging an annular groove formed centrally in the driving clutch member, and the other arm of which carries a cam-roll 188 that engages a groove in a cam-disk 190. The cam-disk 190 is carried by a shaft 192 journaled in a bearing on the base 8, and is driven by a worm-wheel 194 secured thereto, which meshes with a worm 196 secured to the lower end of the clutch-shaft 172. Upon engagement of the low portion 198 of the cam-groove with the cam-roll 188, the driving member 174 of the clutch is slid upward on the shaft 172 into engagement with the driven member 176, and these clutch members are held in engagement until the rotation of the shaft 168 has turned the turret 101 one-quarter of a revolution and the turn-tables 70 one-half a revolution for the purposes hereinbefore described. Upon engagement of the high portion 200 of the cam-groove with the roll 188, the driving member 174 of the clutch is slid downward on the shaft 172 carrying it out of engagement with the driven member 176 and into engagement with the driven member 178. During the period of this engagement of the clutch members 174 and 178, the rotation of the shaft 52 causes the cutting blocks to move upwardly to co-operate with the cutting dies, the feed-fingers 14 to retract, and the upper dies 78 and 80 to move downwardly to act on the blanks held within the cutting dies. With these parts in this position, the clutch member is shifted to neutral position by engagement of the portion 202 of the cam-groove with the cam-roll 188, leaving the blanks under pressure. As the high portion 204 of the cam-groove is carried into engagement with the cam-roll 188, the driving member 174 of the clutch is again shifted into engagement with the driven member 178, whereupon the shaft 52 is further rotated, causing the cutting blocks to retreat, the feed-fingers 14 to advance to feed the strips, and the upper dies 78 and 80 to be raised. The cam-roll 188 immediately enters the low portion 198 of the cam again to repeat the cycle of operations.

The clutch is provided with means for preventing the driven members 176 and 178 of the clutch from turning when disengaged from the driving member. This means comprises a vertical slide-bar 206 (Fig. 7) having its ends guided by bearings on a bracket 208 secured to the base 8 and provided with locking dogs 210 adapted to engage notches 212 and 214 in the driven members 176 and 178, respectively. The slide-bar 206 is actuated by the bell-crank 184, the connection between the bell-crank and the slide-bar comprising an extension 216 of the horizontal arm of the bell-crank, the end of which extension is engaged on opposite sides by the ends of set-screws 218 threaded through lugs on the slide-bar. By rotating the screws, a fine adjustment of the movement of the bar 206 is obtained. With this construction, upon disengagement of the driving member 174 from the driven member 176, an upper locking dog 210 is brought into engagement with one of the notches 212 in the driven member, and upon disengagement of the driving clutch member from the driven member 178, a lower locking dog 210 is brought into engagement with one of the notches 214 in the driven member 178. In both Figs. 1 and 7, these parts are shown in a neutral position.

The clutch-shaft 172 has a worm-wheel 220 (Fig. 1) secured thereto, which is driven by a worm 222 secured to one end of a horizontal driving shaft 224 journaled in a bearing in the base 8. A pulley 226 (Fig. 6) is secured to the other end of the shaft 224 and is connected by a belt 228 with a pulley 230 carried by the shaft of an electric motor 232 which is controlled by a switch 234.

The nature and scope of the present invention having been indicated and a machine described capable of performing the various steps of the invention, which machine is disclosed and claimed in application for Letters Patent of the United States Serial No. 395,820, filed July 13, 1920, in the name of Frederick H. Perry, and of which the present case is a division, what is claimed as new is:

1. The method of making manufactured insoles for welted boots and shoes which comprises simultaneously cutting sole-blanks successively from two strips of sheet insole material at different locations, molding a sewing-rib in a blank from one strip while pressing a blank from the other strip on a previously ribbed blank, and transferring each ribbed blank to the pressing station, to receive the second blank thereon, during the time consumed by the cutting operations.

2. The method of making manufactured insoles for welted boots and shoes which comprises simultaneously molding a sewing-rib in successive sole-blanks and pressing second sole-blanks on previously ribbed blanks, said ribbing and pressing operations taking place at different locations, simultaneously supplying a succession of blanks at each location, and shifting each ribbed blank from one to the other location in the periods between the ribbing and pressing operations.

In testimony whereof I have signed my name to this specification.

EDNA A. PERRY,
*Executrix of the Will of Frederick H. Perry, Deceased.*